(12) United States Patent
Ichikawa

(10) Patent No.: US 7,540,198 B2
(45) Date of Patent: Jun. 2, 2009

(54) SEMICONDUCTOR DEVICE

(75) Inventor: Takeshi Ichikawa, Hachioji (JP)

(73) Assignee: Canon Kabushiki Kaisha, Tokyo (JP)

( * ) Notice: Subject to any disclaimer, the term of this patent is extended or adjusted under 35 U.S.C. 154(b) by 243 days.

(21) Appl. No.: 11/597,501

(22) PCT Filed: Jun. 13, 2005

(86) PCT No.: PCT/JP2005/011191

§ 371 (c)(1),
(2), (4) Date: Nov. 24, 2006

(87) PCT Pub. No.: WO2005/124306

PCT Pub. Date: Dec. 29, 2005

(65) Prior Publication Data

US 2008/0163695 A1 Jul. 10, 2008

(30) Foreign Application Priority Data

Jun. 15, 2004 (JP) ............................. 2004-176853
Dec. 27, 2004 (JP) ............................. 2004-377613

(51) Int. Cl.
*G01L 9/00* (2006.01)
(52) U.S. Cl. .............................. 73/754; 73/721; 73/727
(58) Field of Classification Search .................. 73/721, 73/727, 754
See application file for complete search history.

(56) References Cited

U.S. PATENT DOCUMENTS

| | | | |
|---|---|---|---|
| 5,201,681 A | 4/1993 | Okunuki et al. ................ 445/24 |
| 5,361,015 A | 11/1994 | Okunuki et al. ............... 313/309 |
| 5,466,961 A | 11/1995 | Kikuchi et al. ................ 257/379 |
| 5,598,037 A | 1/1997 | Kikuchi et al. ................ 257/773 |
| 5,693,959 A | 12/1997 | Inoue et al. .................... 257/66 |
| 5,903,043 A | 5/1999 | Ichikawa et al. .............. 257/532 |
| 5,918,115 A | 6/1999 | Kikuchi et al. ................ 438/138 |
| 6,049,235 A | 4/2000 | Ichikawa et al. .............. 327/51 |
| 6,373,099 B1 | 4/2002 | Kikuchi et al. ................ 257/331 |
| 2005/0127415 A1 | 6/2005 | Yuzurihara et al. ........... 257/292 |

FOREIGN PATENT DOCUMENTS

| | | |
|---|---|---|
| JP | 2590960 | 12/1996 |
| JP | 2000-214022 | 8/2000 |

OTHER PUBLICATIONS

Masayuki Yoneda, "Optimized Design of Piezoresistive Pressure Sensors", Aug. 10, 2000, http://jp.yamatake.com./corp/rd/tech/review/pdf/2000_8_01/2000_8_01.pdf.
Preliminary Report on Patentability issued in counterpart application PCT/JP 2005/011191.

*Primary Examiner*—Andre J Allen
(74) *Attorney, Agent, or Firm*—Fitzpatrick, Cella, Harper & Scinto

(57) ABSTRACT

It is an object of the present invention to provide a small, yet high sensitivity semiconductor device. A semiconductor pressure sensor 1 includes an SOI substrate 2 on which a diaphragm 3 is formed and four piezo resistor elements R1 to R4 provided on the SOI substrate 2. Of the piezo resistor elements R1 to R4, two mutually facing piezo resistor elements R1 to R4 are arranged across the inside and outside of the diaphragm 3 so as to satisfy a relationship of 0.5<Leff/L<1, where L is the overall length and Leff is the length from the inside to edge of the diaphragm 3.

16 Claims, 15 Drawing Sheets

SEMICONDUCTOR DEVICE

TECHNICAL FIELD

The present invention relates to a semiconductor device, and more particularly, to a semiconductor device such as a resistor type pressure sensor with a distortion detecting device provided on a semiconductor substrate including a diaphragm section, an acceleration sensor, and a gyro sensor.

BACKGROUND ART

A capacitance type or piezo resistor type pressure sensor is conventionally known as a semiconductor pressure sensor. Among these sensors, one with a piezo resistor element formed on a silicon substrate can be integrated together with a peripheral circuit, etc., into a single chip and easily manufactured, and is therefore used in various application fields and has an extensive range of pressures to be measured.

This type of semiconductor pressure sensor is provided with a diaphragm formed through etching of a semiconductor substrate and a piezo resistor element formed with a predetermined positional relationship with the diaphragm.

Japanese Patent Application Laid-Open No. 2000-214022 discloses a semiconductor pressure sensor with the position of a piezo resistor element from an end of a diaphragm set according to the thickness of the diaphragm. According to the document, a diaphragm having a width H1 of 580 μm parallel to the <001> direction and a width H2 of 630 μm parallel to the <-110> direction perpendicular thereto is formed on a single crystal silicon (110) substrate. In that case, when the piezo resistor element is placed along the width H2 direction, the relationship between the thickness of the diaphragm and the peak position of compression stress from the center of the diaphragm is as shown in FIG. 21. In FIG. 21, when the thickness of the diaphragm is smaller than 60 μm, the peak position of compression stress is in the vicinity of the end of the diaphragm. When the thickness of the diaphragm is greater than 60 μm, the peak position of compression stress is outside the diaphragm and the distance increases as the thickness of the diaphragm increases.

"Optimal Design of Piezo Resistance Pressure Sensor" (Masayuki Yoneda, [online], Aug. 1, 2000, Yamatake Corporation, Internet <URL: http://jp.yamatake.com/corp/rp/tech/review/pdf/2000_8_01/2000_8_01.pdf> discloses that the output has been substantially doubled using the direction perpendicular to the diaphragm and the direction parallel thereto as current directions. The principal plane of an Si substrate is (100) and four n-type resistors are arranged in a p-type diffusion layer in the <110> direction. FIG. 22 shows a graph of a stress distribution with respect to the distance from the center of the diaphragm in the semiconductor pressure sensor disclosed in the above described URL. The graph shows that when the pressure on the diaphragm decreases, the stress is concentrated on a diaphragm edge.

There are proposals on further miniaturization of a pressure sensor and application for measurements in a living body or for micromachines, etc., in recent years. This requires a high sensitivity pressure sensor having a diaphragm with a smaller area than the actual diaphragm using a semiconductor process which allows integration on a single chip. A resistance variation of silicon is generally determined by a value proportional to the product of a piezo resistance coefficient by stress. In the case of a square diaphragm having a length per side of h and a thickness of a, a maximum value of stress of the diaphragm is proportional to $(h/a)^2$ and sensitivity of the pressure sensor depends on the maximum value of the stress. Therefore, when the size of the diaphragm is reduced, the sensitivity decreases drastically. On the other hand, when the thickness a is decreased so as to increase the maximum value of the stress, the mechanical strength of the diaphragm decreases. Therefore, realizing a smaller pressure sensor requires a structure capable of attaining high sensitivity without reducing the thickness of the diaphragm.

However, the above described documents make no mention of local values as a small pressure sensor of the diaphragm. That is, the above described Japanese Patent Laid-Open Publication discloses the sensor having a distance from the center to the edge of the diaphragm of approximately 300 μm (length of one side is approximately 600 μm). Furthermore, the disclosure at the above described URL shows a technical opinion on a large diaphragm having approximately 440 μm (length of one side is approximately 880 μm). No knowledge is available of stress or resistor arrangement in the vicinity of edges of a pressure sensor including a small diaphragm having a distance from the center to the edge of the diaphragm of 200 μm or less (length of one side is approximately 400 μm).

The above described demand for attaining high sensitivity without reducing the thickness of the diaphragm is not limited to a pressure sensor but common to semiconductor devices including a diaphragm.

Thus, it is an object of the present invention to provide a high sensitivity semiconductor device provided with a small diaphragm, particularly in such a small structure that the distance from the center to the edge is 200 μm or less yet preventing the thickness of the diaphragm from being reduced more than necessary.

DISCLOSURE OF THE INVENTION

The semiconductor device according to the present invention to attain the above described object is a semiconductor device with one or more distortion detecting devices provided on a semiconductor substrate having a diaphragm section, characterized in that at least one of the distortion detecting devices has a first end in the diaphragm section and is arranged so as to extend across the inside and outside of the diaphragm section to satisfy a relationship of 0.5<Leff/L<1, where L is the overall length of the distortion detecting devices and Leff is the length from the first end of the distortion detecting device to an edge of the diaphragm section.

With the distortion detecting devices arranged in this way, it is possible to effectively use the effective areas of the distortion detecting devices to which stress is applied.

Other features and advantages of the present invention will be apparent from the following description taken in conjunction with the accompanying drawings, in which like reference characters designate the same or similar parts throughout the FIGS. thereof.

The accompanying drawings, which are incorporated in and constitute a part of the specification, illustrate embodiments of the invention and, together with the description, serve to explain the principles of the invention.

BEST MODE FOR CARRYING OUT THE INVENTION

With reference now to the attached drawings, embodiments of the present invention will be explained below.

Figure 1A:
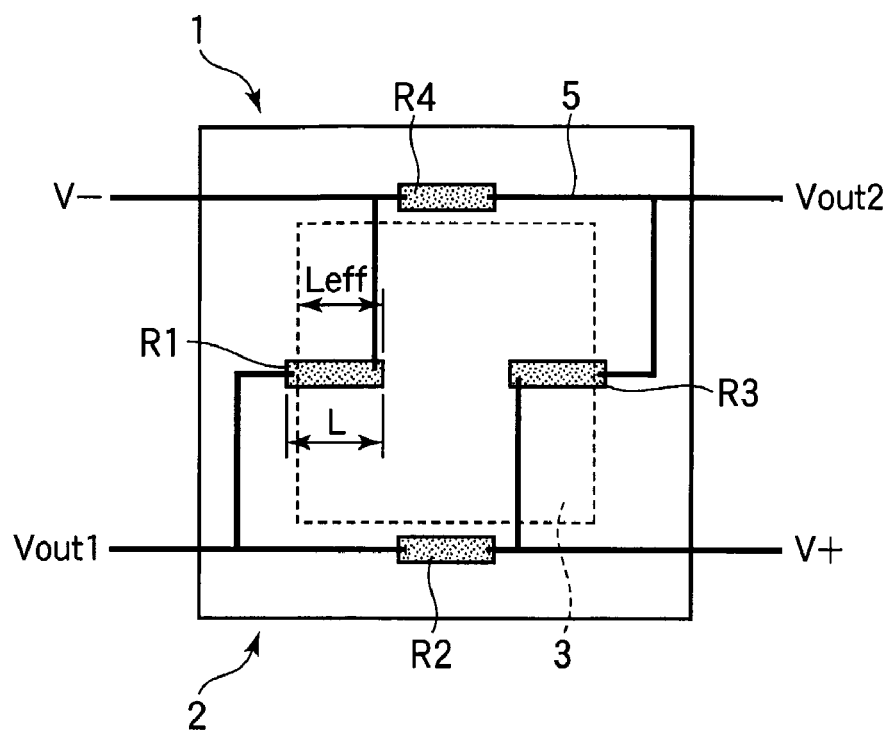
FIGS. 1A and 1B are schematic plan view and sectional view of a semiconductor pressure sensor according to an embodiment (Embodiment 1) of the present invention.
Figure 1B:
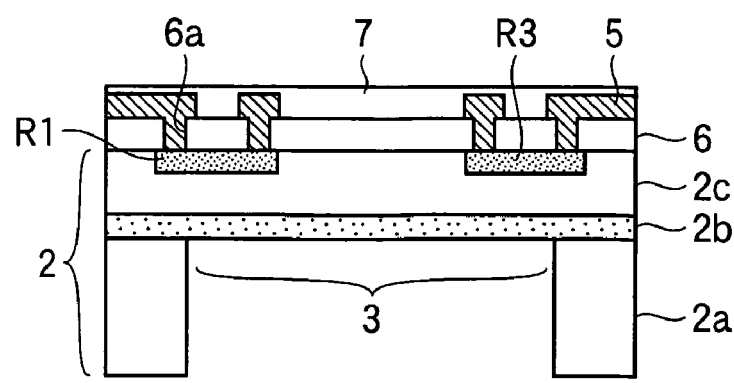

FIGS. 1A and 1B are schematic views of a semiconductor pressure sensor according to an embodiment of the present invention, FIG. 1A is a plan view and FIG. 1B is a sectional view along a line penetrating the center of two opposing piezo resistor elements.

The semiconductor pressure sensor 1 according to this embodiment is constructed of a diaphragm 3, four piezo resistor elements R1 to R4 as distortion detecting devices and wiring 5, etc., for electrically connecting these elements on an SOI (Silicon On Insulator) substrate 2 using a semiconductor process.

The SOI substrate 2 is a substrate having a 3-layer structure with an embedded oxide film 2b inserted between a supporting layer 2a made of silicon and a surface layer 2c. The supporting layer 2a is partially removed from the area of the SOI substrate 2 and the diaphragm 3 is made up of the remaining embedded oxide film 2b and surface layer 2c. The piezo resistor elements R1 to R4 are formed as diffusion areas formed by injecting impurity ions into the surface layer 2c on the surface side. This embodiment assumes that the piezo resistor elements R1 to R4 have rectangular planes. The respective piezo resistor elements R1 to R4 are arranged at edges of the diaphragm 3 with their longitudinal directions (direction in which a current flows in the element) oriented parallel to the surface of the substrate and in the same direction. Of the piezo resistor elements R1 to R4, the two piezo resistor elements R1, R3 are disposed so as to face each other across the inside and outside of the diaphragm 3 in such a way that their longitudinal directions are oriented from the edge to the center of the diaphragm 3 at the positions of the piezo resistor elements R1, R3. The remaining two piezo resistor elements R2, R4 are disposed so as to face each other outside the diaphragm 3 in the direction perpendicular to the facing directions of the piezo resistor elements R1, R3.

An inter-layer insulating film 6 is formed on the surface of the SOI substrate 2. Contact holes 6a are formed in the parts of the inter-layer insulating film 6 corresponding to the respective piezo resistor elements R1 to R4, and the piezo resistor elements R1 to R4 are electrically connected so as to construct a Wheatstone bridge circuit by wiring 5 which is formed on the inter-layer insulating film 6 through the contact holes 6a. The wiring 5 and inter-layer insulating film 6 are covered with a protective film 7.

In the semiconductor pressure sensor 1 constructed as described above, suppose the overall length of the two opposing piezo resistor elements R1, R3 out of the piezo resistor elements R1 to R4 is L and the effective length within the diaphragm 3 is Leff. Here, the overall length L represents the length of the portion of the piezo resistor elements R1, R3 which functions as a resistor, that is, the overall length of the path through which a current flows. The effective length Leff out of the overall length L represents the length of the portion within the diaphragm 3 parallel to the direction from the edge to the center of the diaphragm 3. In other words, the piezo resistor elements R1, R3 have a first end which exists in the diaphragm section (thin-film area) and a second end which exists in an area outside the diaphragm section (thick-film area) and faces the first end, and the length from an edge of the diaphragm to the first end is Leff. Here, the first end substantially coincides with the area which has electric contact with the wiring 5. At this time, when the resistance corresponding to a length X of the piezo resistor elements R1 to R4 is expressed as R(X), the total resistance R(L) is the sum of the resistance corresponding to the effective length Leff and the resistance corresponding to the remaining length L−Leff and can be expressed as:

$$R(L)=R(Leff)+R(L-Leff) \quad (1)$$

Figure 2:
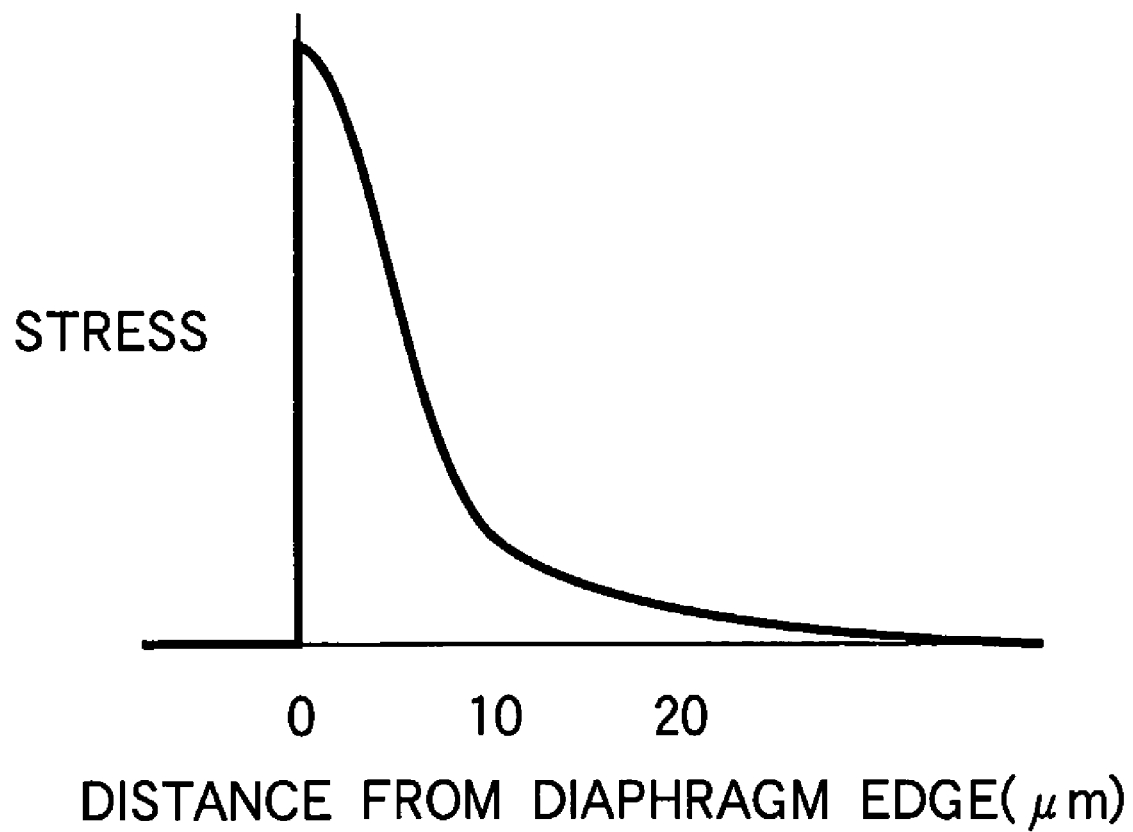
FIG. 2 is a graph showing a relationship between the distance from an edge of a diaphragm and stress acting on the diaphragm in the semiconductor pressure sensor shown in FIG. 1.

Suppose the diaphragm 3 is a square having a length per side of 400 μm and a thickness of 3 μm. FIG. 2 is a graph showing a relationship between the distance from the edge of the diaphragm 3 and stress applied to the diaphragm 3 when a pressure of 20 kPa is applied to the diaphragm 3. It is evident from FIG. 2 that stress concentrates on an area where the distance from the edge of the diaphragm 3 is 20 μm or less, especially, 10 μm or less and the value increases as the distance from the edge of the diaphragm 3 becomes shorter. Thus, it is appreciated that stress is applied quite locally when the size of the diaphragm 3 is small and the diaphragm 3 constitutes a low pressure area. However, when Leff is 2 μm and thinner than the thickness of the diaphragm 3, stress in that part is small and the output decreases. Therefore, by setting Leff to the thickness of the diaphragm 3 or greater, it is possible to make stress more concentrated. According to more detailed data, Leff is also related to the length per side h of the square diaphragm 3 and it is known that when Leff is $\sqrt{h}$ or less, a very high effect is obtained, that is, sensitivity improves. When the target is even extended to a circular diaphragm 3, the length per side h in the case of a square roughly corresponds to the diameter.

The rate of change of resistance when constant stress is applied to a piezo resistor can be expressed using a piezo resistance coefficient π as follows:

$$\Delta R/R = A\pi\rho \quad (2)$$

where ΔR denotes a variation of resistance, R denotes resistance before stress is applied, A denotes a constant and ρ denotes a pressure. When the stress distribution exists only within the part of the effective length Leff inside the diaphragm 3, the rate of change of resistance of a resistor having an overall length L is:

$$\Delta R(Leff)/R(Leff)=A\int \pi\rho(X,Y,Z)dxdydz \quad (3)$$

Therefore, the rate of change of resistance when stress is applied is $$\Delta R/R=R(Leff)A\int \pi\rho(X,Y,Z)dxdydz/R(L) \quad (4)$$

Form Expression (4), the resistance variation increases and sensitivity increases as Leff increases. From this, in order to increase sensitivity, it is important to arrange the piezo resistor elements R1, R3 in the positions where stress is concentrated.

The result of a study conducted by the present inventor et al. on optimal positions of the piezo resistor elements R1, R3 in order to increase sensitivity of the semiconductor pressure sensor 1 shows that when the effective length Leff is 50% or less of the overall length L, sensitivity of the semiconductor pressure sensor 1 decreases drastically. On the other hand, in theory, it is most preferable to arrange the piezo resistor elements R1, R3 on the diaphragm 3 so that their ends (above described second ends) coincide with the edges of the diaphragm 3 from the standpoint of sensitivity, but in the case of the pressure sensor, which is the target of the present invention, having an extremely small diaphragm area, the sensitivity decreases extremely when the piezo resistor elements R1, R3 go away from the edges of the diaphragm 3 even slightly. For this reason, when manufacturing variations, etc., are taken into consideration, it is necessary to set Leff/L<1, that is, the piezo resistor elements R1, R3 should extend outside the diaphragm 3, that is, Leff<L.

Thus, in this embodiment, the piezo resistor elements R1, R3 are arranged at positions that satisfy a relationship:

$$0.5 < Leff/L < 1 \quad (5)$$

As explained above, the piezo resistor elements R1, R3 are arranged so as to satisfy Expression (5) above and the ratio of the effective areas of the piezo resistor elements R1, R3 to which stress is applied increases, and therefore it is possible to realize a high sensitivity semiconductor pressure sensor 1 even when the size of the diaphragm 3 is so small that the distance from the center to the edge is 200 μm or less and the thickness of the diaphragm 3 is enough to keep required strength.

Furthermore, if the result shown in FIG. 2 is also taken into consideration, stress is concentrated on the vicinity of the edges of the diaphragm 3 when a pressure is applied to the diaphragm 3, or more specifically within the range of the distance from the edges of 20 μm or less, 10 μm or less in particular. Therefore, the distance from the edges of the diaphragm 3 inside the diaphragm 3 of the part parallel to the direction from the edge to the center of the diaphragm 3 of the piezo resistor elements R1, R3, in other words, the distance LX (length equal to the effective length Leff in a linear type piezo resistor element) from the edge of the diaphragm 3 to the end on the center side of the diaphragm 3 is preferably within this range. That is, when the piezo elements R1, R3 are preferably arranged within a range of 20 μm or less or more preferably 10 μm or less, the improvement of sensitivity is further promoted. The structure shown in FIGS. 1A and 1B can also be adapted so that at least one distortion detecting device consists of the first end which exists in the diaphragm section and the second end which exists outside the diaphragm section and faces the first end and the distance between the edge of the diaphragm section and the first end can also be LX.

Furthermore, when the thickness of the diaphragm 3 is a, it is important that Leff≧a. When Leff is smaller than the thickness of the diaphragm 3, stress may not be applied effectively. Furthermore, when the length of one side of the diaphragm 3 is h, it is preferable that $\sqrt{h}$≧h.

Here, this embodiment has explained the pressure sensor as an example, but the present invention is not limited to this and is also applicable to a device whose electrical characteristic changes due to concentration of stress such as acceleration sensor or other semiconductor device such as gyro sensor.

Figure 3A:
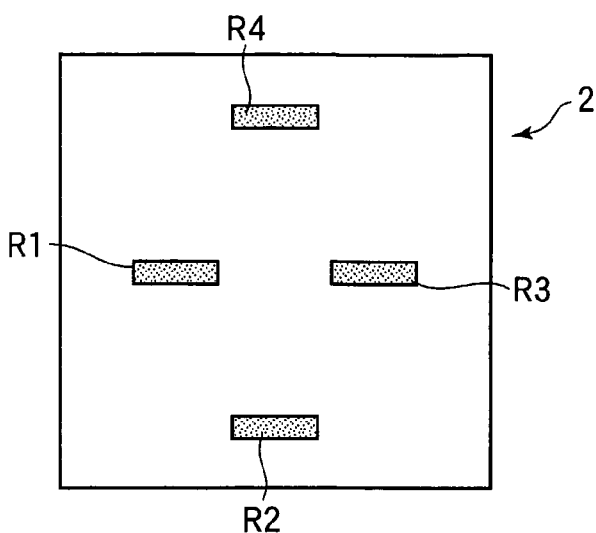
FIGS. 3A, 3B and 3C are plan views illustrating an example of manufacturing processes of the semiconductor pressure sensor shown in FIGS. 1A and 1B.
Figure 3B:
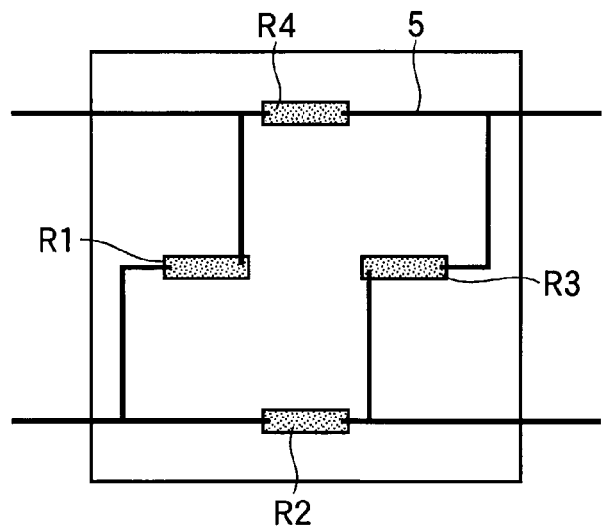
Figure 3C:
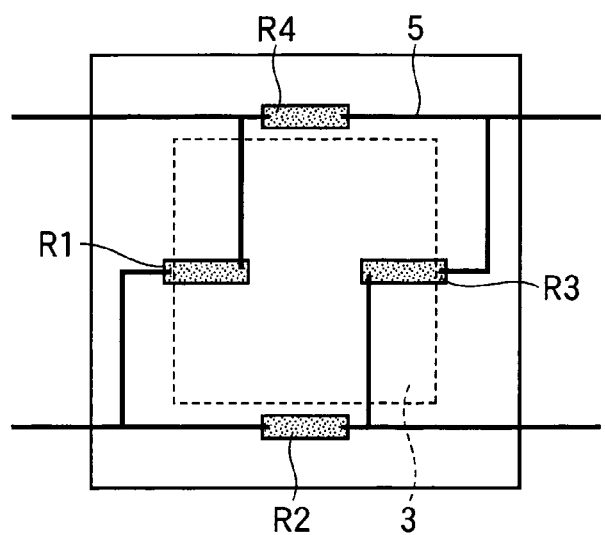

Next, an example of a method of manufacturing the semiconductor pressure sensor 1 shown in FIG. 1A will be explained with reference to FIGS. 3A to 3C and FIGS. 4A to 4C. FIGS. 3A to 3C are plan views illustrating an example of manufacturing processes of the semiconductor pressure sensor shown in FIGS. 1A and 1B. Furthermore, FIGS. 4A to 4C are sectional views illustrating an example of the manufacturing process of the semiconductor pressure sensor shown in FIGS. 1A and 1B, and FIGS. 4A to 4C correspond to the respective steps in FIGS. 3A to 3C.

Figure 4A:
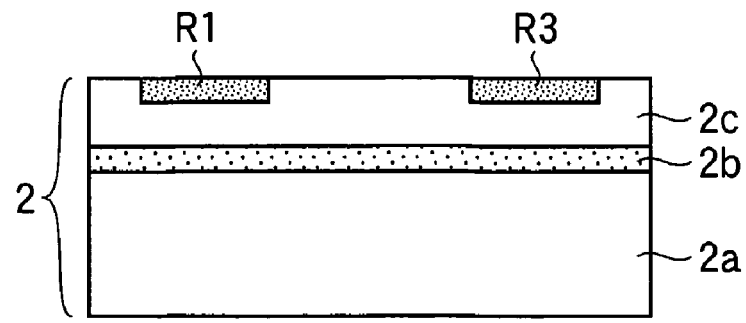
FIGS. 4A, 4B and 4C are sectional views illustrating an example of the manufacturing process of the semiconductor pressure sensor shown in FIGS. 1A and 1B.

First, as shown in FIG. 3A and FIG. 4A, the SOI substrate 2 having a 3-layer structure of the supporting layer 2a, embedded insulating film 2b and surface layer 2c is used as a semiconductor substrate. The piezo resistor elements R1 to R4 are formed by forming diffusion layers in some areas of the surface layer 2c. The diffusion layers are generally formed using an ion injection method, but the method is not limited to the ion injection method and it is also possible to use a diffusion method or the like.

Figure 4B:
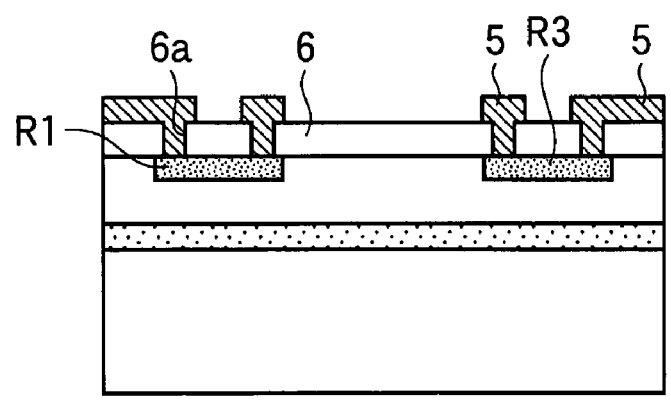

Next, as shown in FIG. 3B and FIG. 4B, the inter-layer insulating film 6 is formed on the surface of the SOI substrate 2 on which the piezo resistor elements R1 to R4 have been formed. The contact holes 6a are formed at predetermined positions corresponding to the piezo resistor elements R1 to R4 of the inter-layer insulating film 6. Furthermore, the wiring 5 for electrically connecting the piezo resistor elements R1 to R4 is formed on the inter-layer insulating film 6 according to a predetermined pattern to construct a Wheatstone bridge circuit.

Figure 4C:
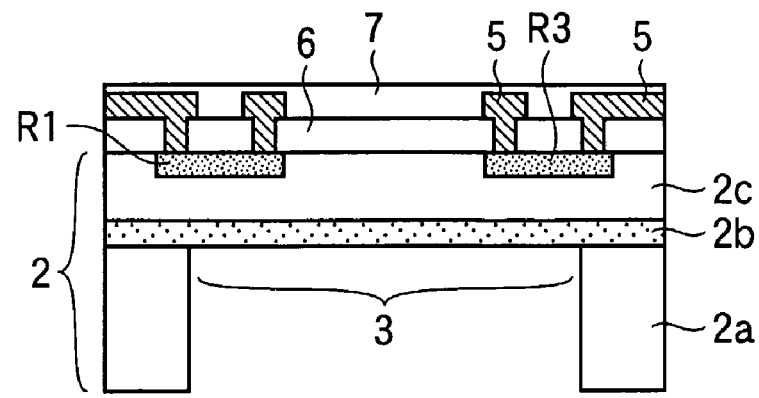

Next, as shown in FIG. 3C and FIG. 4C, the protective film 7 covering the wiring 5 and inter-layer insulating film 6 is formed and a portion of the supporting layer 2a of the SOI substrate 2 is removed to form the diaphragm 3. The diaphragm 3 can be formed by applying a resist to the back of the SOI substrate 2, then patterning the resist, causing the supporting layer 2a to be exposed into a predetermined shape in accordance with the shape of the diaphragm 3 and etching the SOI substrate 2 from the back. The etching method is not particularly limited and anisotropic etching using an etching liquid and dry etching such as RIE (Reactive Ion Etching) can be used. Above all, RIE using a Bosch process is most preferable when position controllability between the diaphragm 3 and the piezo resistor elements R1 to R4 is taken into consideration.

Here, the diaphragm 3 is formed after the piezo resistor elements R1 to R4 are formed, but it is also possible to form the piezo resistor elements R1 to R4 after forming the diaphragm 3. Forming the diaphragm 3 requires etching in a maximum range and a maximum depth among a series of manufacturing processes of the semiconductor pressure sensor 1. For this reason, this is one of the parts hard to form into a desired shape compared to the rest of the structure. Thus, it is possible to improve the positional accuracy of the piezo resistor elements R1 to R4 with respect to the diaphragm 3 by forming the diaphragm 3 first and then forming the piezo resistor elements R1 to R4 in accordance with the diaphragm 3 formed. The parts of the piezo resistor elements R1 to R4 which substantially function as the distortion detecting devices are the areas where a current flows. Therefore, the above described effect can be obtained even if the diaphragm 3 is formed after forming the piezo resistor elements R1 to R4, if the diaphragm 3 is formed before the wiring 5 is connected to the piezo resistor elements R1 to R4 or before the connection positions of the wiring 5 are confirmed. More specifically, it is before the contact holes 6a for connection with the wiring 5 are formed. That is, it is possible to confirm the positions of the piezo resistor elements R1 to R4 after forming the diaphragm 3 based on the position thereof.

Furthermore, it is also possible to form the piezo resistor elements R1 to R4 by forming diffusion areas over the entire surface layer 2c of the SOI substrate 2 and electrically separating the areas of the piezo resistor elements R1 to R4 from other areas. The areas of the piezo resistor elements R1 to R4 can be separated from other areas, for example, by forming grooves around the areas which become the piezo resistor elements R1 to R4. In this case, the positions of the piezo resistor elements R1 to R4 are confirmed by forming the above described grooves.

This embodiment has so far shown the example where the SOI substrate 2 is used as the semiconductor substrate, but the semiconductor substrate need not be the SOI substrate 2 and can also be a normal Si substrate, etc. When the SOI substrate 2 is used, it is possible to use the embedded insulating film 2b as an etching stop layer when the diaphragm 3 is formed.

Figure 5A:
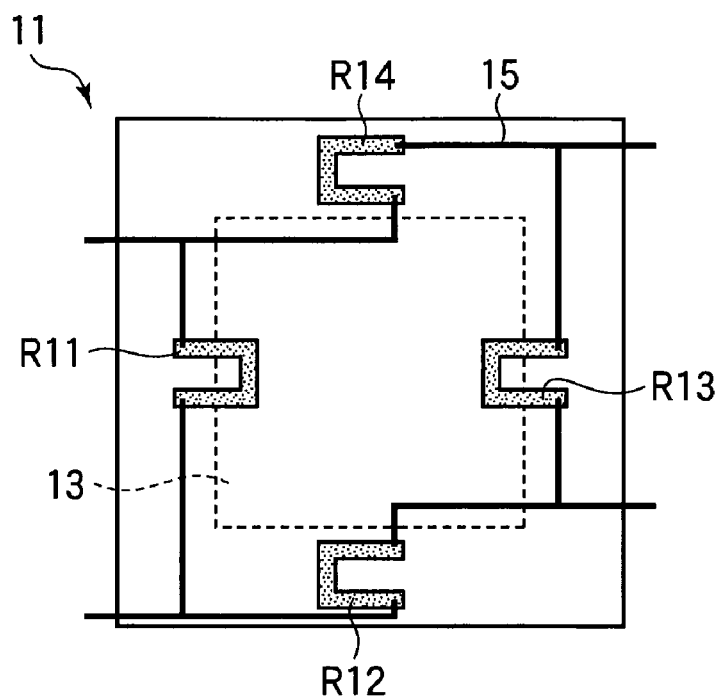
FIGS. 5A and 5B are schematic plan views of a semiconductor pressure sensor according to another embodiment (Embodiment 2) of the present invention.
Figure 5B:
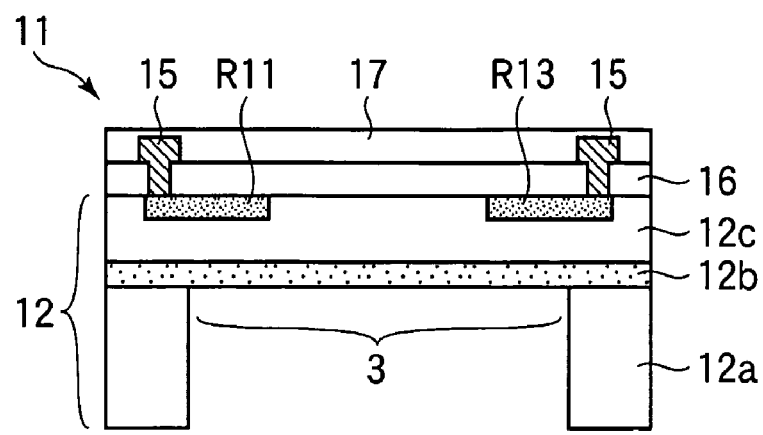

Furthermore, this embodiment has shown the linear type piezo resistor elements R1 to R4 as the distortion detecting devices, but the shape is not limited to the linear type. An example is shown in FIGS. 5A and 5B as a second embodiment of the present invention. A semiconductor pressure sensor 11 shown in FIGS. 5A and 5B includes loopback type piezo resistor elements R11 to R14. In this semiconductor pressure sensor 11, a diaphragm 13 is formed by reducing the thickness of a portion of an SOI substrate (semiconductor substrate) 12. The arrangement of the piezo resistor elements R11 to R14 with respect to this diaphragm 13 is the same as that of the semiconductor pressure sensor 1 shown in FIG. 1A. Furthermore, with regard to the manufacturing method, too, this embodiment differs only in the shape of the piezo resistor elements R11 to R14 and the wiring pattern, and therefore the semiconductor pressure sensor 11 can be manufactured in the same way as the semiconductor pressure sensor 1 in FIGS. 3A to 3C and 4A to 4C. The sectional structure is also the same as that of the semiconductor pressure sensor 1 shown in FIG. 1A.

However, the piezo resistor elements R11 to R14 shown in FIGS. 5A and 5B are different in shape from those shown in FIGS. 1A and 1B, and therefore sizes L and Leff related to the piezo resistor elements R11 to R14 will be determined as follows.

Figure 6:
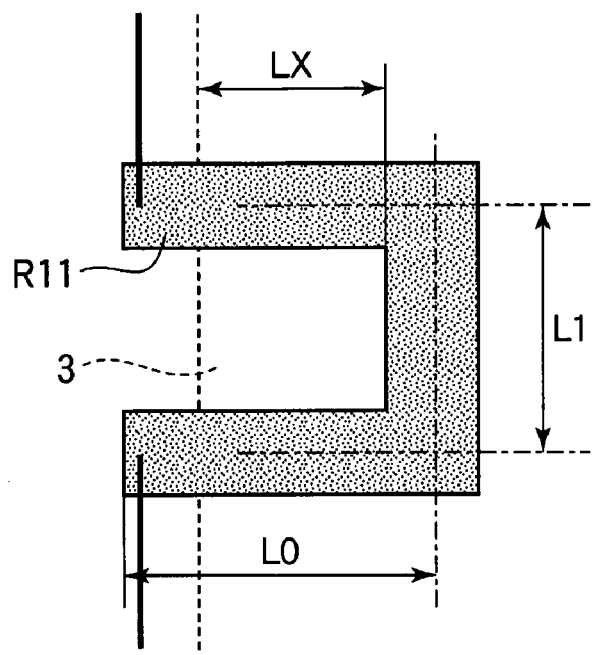
FIG. 6 is an enlarged plan view of the piezo resistor element disposed across the edge of the diaphragm of the semiconductor pressure sensor shown in FIGS. 5A and 5B.

Of the piezo resistor elements R11 to R14, FIG. 6 shows an enlarged plan view of the piezo resistor element R11 disposed across an edge of the diaphragm 13. As shown in FIG. 6, the piezo resistor element R11 is placed so that both loopback ends are arranged outside the diaphragm 13. Here, suppose the length between the centers in the width direction of the piezo resistor element R11 in the direction parallel to the edge of the diaphragm 13 is L1. Suppose the length from the end of the piezo resistor element R11 to the center of the portion thereof in the width direction parallel to the edge of the diaphragm 13 in the direction perpendicular to the edge of the diaphragm 13 (in the direction from the edge of the diaphragm 13 to the center) is L0. Furthermore, the length from the edge of the diaphragm 13 to the portion of the piezo resistor element R11 parallel to the edge of the diaphragm 13 in the area of the diaphragm 13 corresponds to the aforementioned distance LX. In such a structure, the piezo resistor element includes a first area disposed across the outside and inside of the diaphragm section and a loopback section formed in the diaphragm section in contact with the first area. The distance from the area where the first area contacts the loopback section to the edge of the diaphragm section can also be called LX. Furthermore, in the case of a linear resistor, LX=Leff and in the case of folded one, Leff is twice LX. When the resistor has an angle, Leff>LX.

At this time, since the overall length L is the length that functions as the resistor, that is, the overall length of the path through which a current flows, L is expressed as:

$$L = 2L0 + L1 \quad (6)$$

Furthermore, since the loopback section is formed, there are two parts that have the directional components extending across the edge of the diaphragm 13 and the effective length Leff is expressed as the sum of the two:

$$Leff = 2LX \quad (7)$$

In this case, by arranging the piezo resistor elements R11, R13 so as to satisfy Expression (5), it is also possible to reduce the size of the diaphragm 13 such that the distance from the center to the edge is 200 μm or less. Moreover, the effect that it is possible to realize the high sensitivity semiconductor pressure sensor 11 with the diaphragm 13 having a thickness enough to keep necessary strength is the same as that of a linear piezo resistor element. Furthermore, the fact that the improvement of sensitivity is further promoted by setting LX to 20 μm or less and more preferably to 10 μm or less is also the same as that of the linear type piezo resistor element. Here, the piezo resistor elements R11 to R14 with folded one have been shown, but the number of folded ones can also be plural.

The shape of the distortion detecting device has been explained so far. With regard to the number of distortion detecting devices, there may be at least one distortion detecting device disposed across the edge of the diaphragm. Furthermore, the shape of the diaphragm is not limited to a square, but the present invention is also applicable to various shapes such as rectangle, polygon, circle and elliptic.

Embodiments

Next, specific embodiments of the present invention will be explained below.

Embodiment 1

In this embodiment, the semiconductor pressure sensor 1 including the linear piezo resistor elements R1 to R4 shown in FIGS. 1A and 1B was manufactured. The semiconductor substrate is the SOI substrate 2 which consists of the surface layer 2c of 3 μm in thickness with n-type $1\times10^{16}/cm^3$ phosphorus injected and the embedded insulating film 2b of 300 nm in thickness. The piezo resistor elements R1 to R4 are formed of p-type diffusion areas obtained through ion injection of boron into the areas of the surface layer 2c to be the piezo resistor elements R1 to R4 and their sheet resistance showed a value of 2.5 kΩ. The piezo resistor elements R1 to R4 were formed by forming a thermal oxide film to a film thickness of 30 nm on the surface of the SOI substrate 2, applying a resist thereto and patterning the areas in which the piezo resistor elements R1 to R4 are formed. Then, a dose of $5\times10^{13}/cm^2$ of $BF_2$ was injected using an ion injection method at an acceleration voltage of 60 kV, and after peeling away the resist and cleaning, the surface layer 2c of the SOI substrate 2 was activated through 30-minute thermal treatment at 1000° C. in a nitrogen atmosphere. The overall length L of the piezo resistor elements R1 to R4 was set to 20 μm.

The inter-layer insulating film 6 was formed of a thermal oxide film to a thickness of 200 nm. The wiring 5 was formed in a predetermined pattern by sputtering an aluminum film and a Wheatstone bridge circuit was constructed. The protective film 7 is an SiN film formed using a plasma CVD method and formed to a thickness of 300 nm. Furthermore, to form a pad for an electrical connection to the outside, the wiring 5 was partially exposed through application of a resist to the SiN film, patterning and dry etching.

The diaphragm 3 was formed using an ICP-RIE (Inductive Coupled Plasma-RIE) method from the supporting layer 2a side of the SOI substrate 2 and etching the supporting layer 2a in a direction substantially perpendicular to the surface of the substrate using a Bosch process. At this time, the embedded oxide film 2b was used as an etching stopper layer. The diaphragm 3 was formed into a square having a length per side of 400 μm. The thickness of the diaphragm 3 was set to approximately 3 μm.

Figure 7:
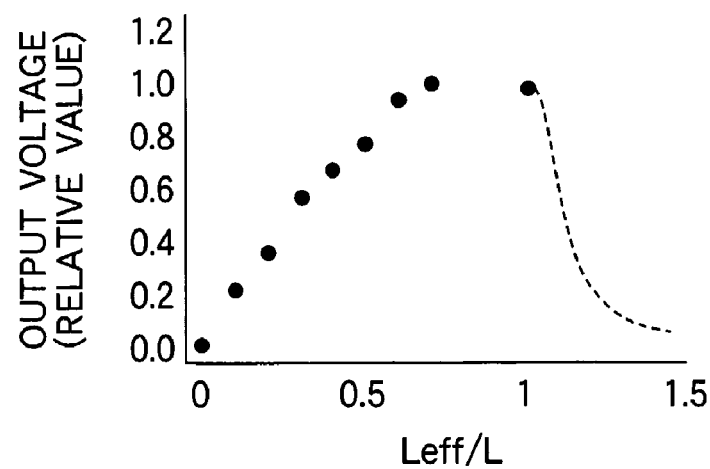
FIG. 7 is a graph showing a relationship between Leff/L and an output voltage value in the semiconductor pressure sensor shown in FIGS. 1A and 1B.

Here, several semiconductor pressure sensors 1 were created by changing the positions of the piezo resistor elements R1, R3, and a relationship between the value of Leff/L and the output voltage was examined when a pressure of 100 kPa was applied. The result is shown in FIG. 7. In FIG. 7, the output voltage is expressed relative to a peak value. From FIG. 7, it is appreciated that when Leff/L is smaller than 0.5, the output voltage decreases drastically. Though it actually depends on the size of the diaphragm 3, the boundary on which the output voltage drops drastically is generally Leff/L=0.5. As the size of the diaphragm 3 decreases, the thickness decreases and the pressure to which the semiconductor pressure sensor 1 corresponds decreases or the overall length L of the piezo resistor elements R1, R2 decreases, this tendency that the output voltage decreases drastically at Leff/L=0.5 or less becomes more noticeable.

Figure 8:
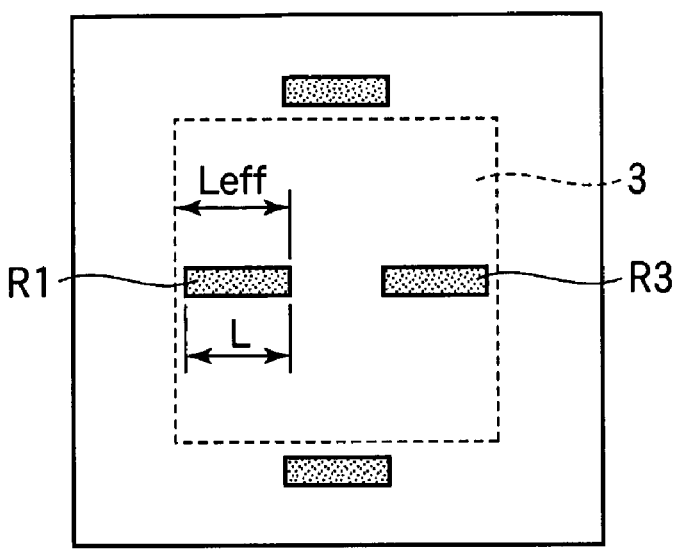
FIG. 8 is a plan view of a semiconductor pressure sensor which is a comparative example of the present invention with two opposing piezo resistor elements arranged in the area of a diaphragm.

For example, even when Leff=L, in other words, Leff/L=1, if the piezo resistor elements R1, R3 are arranged completely inside the area of the diaphragm 3 as shown in FIG. 8, it is also appreciated that the output voltage decreases drastically. If the effective length Leff of the piezo resistor elements R1, R3 is defined as the distance from the edge of the diaphragm 3 to the end of the piezo resistor elements R1, R3 on the center side of the diaphragm 3, Leff>L at the position shown in FIG. 8 and the output voltage in this case decreases as the piezo resistor elements R1, R3 go away from the edges of the diaphragm 3 as shown by the dotted line in FIG. 7.

Embodiment 2

In this embodiment, the semiconductor pressure sensor 11 including the loopback type piezo resistor elements R11 to R14 shown in FIGS. 5A and 5B was manufactured. The manufacturing processes of the semiconductor pressure sensor 11 of this embodiment will be explained with reference to FIGS. 5A and 5B below.

The same SOI substrate 12 as that in Embodiment 1 was used. First, an oxide film (not shown) was formed on the surface of the SOI substrate 12 to a film thickness of 30 nm. A resist was applied thereto and the areas where the piezo resistor elements R11 to R14 were to be formed were patterned. Then, a dose of $5\times10^{13}/cm^2$ of $BF_2$ was injected using an ion injection method at an acceleration voltage of 60 kV, and after peeling the resist and cleaning, the surface layer 12c of the SOI substrate 12 was activated through 30-minute thermal treatment at 1000° C. in a nitrogen atmosphere to form the piezo resistor elements R11 to R14.

Next, an SiO film was formed as the inter-layer insulating film 16 on the surface of the SOI substrate 12 using a plasma CVD method. The contact holes are formed at predetermined positions corresponding to the piezo resistor elements R11 to R14 of the SiO film through resist patterning and using a dry etching method. On top of it, aluminum wiring 15 was formed using a sputtering method and a Wheatstone bridge circuit was constructed. Moreover, an SiN film was formed as the protective film 17 on the surface thereof using a plasma CVD method. Then, to form a pad for an electrical connection to the outside, the wiring 15 was partially exposed through application of the SiN film to the resist and patterning and dry etching.

Next, a plasma oxide film was piled on the back of the SOI substrate 12 (surface on the supporting layer 12a side) to a film thickness of 3 μm. Then, through application of the resist to the surface of the plasma oxide film and resist patterning, the plasma oxide film is subjected to dry etching. Then, the supporting layer 12a is etched through ICP-RIE to form the diaphragm 13. The resist patterning was carried out in accordance with the arrangement of the piezo resistor elements R11 to R14. The supporting layer 12a was etched using $SF_6$ and $C_4F_8$ as etching gases at an angle substantially 90 degrees from the surface of the substrate through a Bosch process. In this case, the embedded oxide film 12b of the SOI substrate 12 was used as an etching stopper layer. The diaphragm 13 was formed into a square having a length per side of 400 μm.

By manufacturing the semiconductor pressure sensor 11 through the above described steps, it was possible to form Leff, LX of the piezo resistor elements R11 to R14 accurately with respect to the diaphragm 13 and the high sensitivity semiconductor pressure sensor 11 was obtained.

Figure 9:
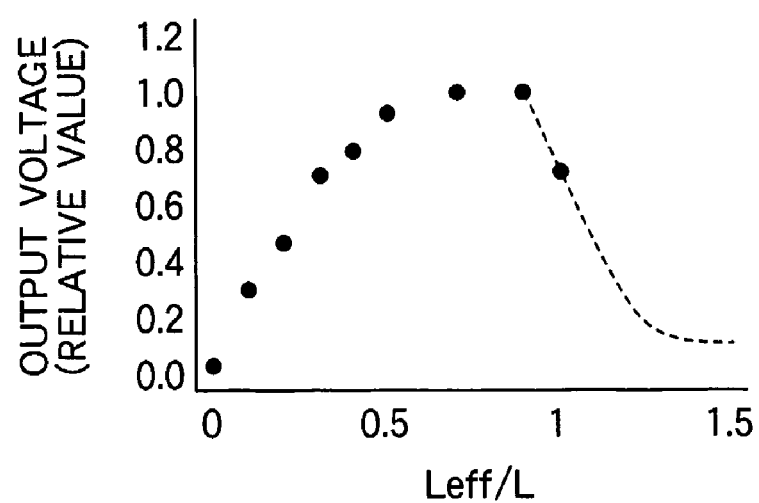
FIG. 9 is a graph showing a relationship between Leff/L and an output voltage value in the semiconductor pressure sensor shown in FIGS. 5A and 5B.

Here, a relationship between Leff/L and output voltage was examined by setting the overall length L of the piezo resistor elements R11, R13 to L=90 μm, setting L0=10 μm in FIG. 6, changing the value of Leff and applying a pressure of 20 kPa to the semiconductor pressure sensor 11. The result is shown in FIG. 9. As is evident from FIG. 9, the output voltage dropped drastically when Leff/L fell below 0.5. Furthermore, in this embodiment, since the piezo resistor elements R11, R13 are of a loopback type, the output voltage dropped when Leff/L exceeded approximately 0.9.

Figure 10:
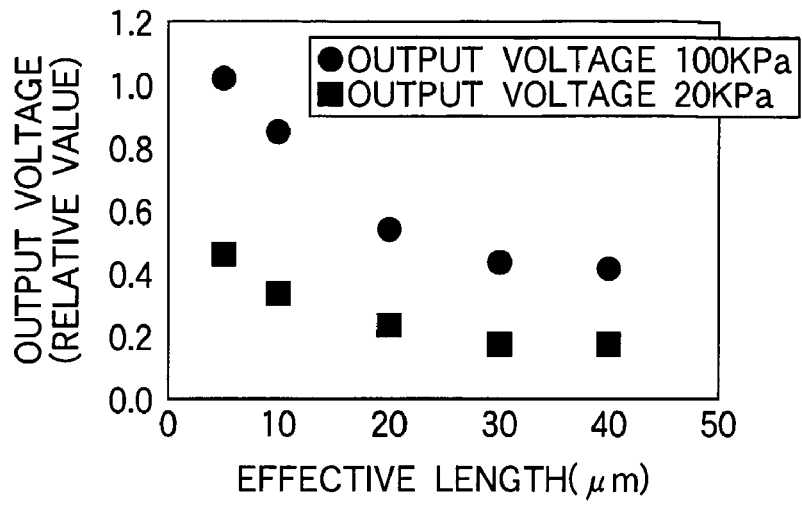
FIG. 10 is a graph showing the Leff dependency of the semiconductor pressure sensor shown in FIGS. 5A and 5B.

FIG. 10 shows the Leff dependency of the semiconductor pressure sensor 11 manufactured with the value of Leff/L fixed to 0.6 by changing the value of Leff. An experiment was conducted under two conditions when the pressure applied to the semiconductor pressure sensor 11 was 20 kPa and 100 kPa. From FIG. 10, it is appreciated that the output voltage increases when LX falls below 20 μm. Especially, when LX falls below 10 μm, the tendency becomes more noticeable. This is because stress is concentrated on the vicinity of the edge of the diaphragm 13 and from this, it is appreciated that it is important to arrange the piezo resistor elements R11, R13 in an area within 20 μm from the edge of the diaphragm 13, within 10 μm if possible.

Embodiment 3

Figure 11:
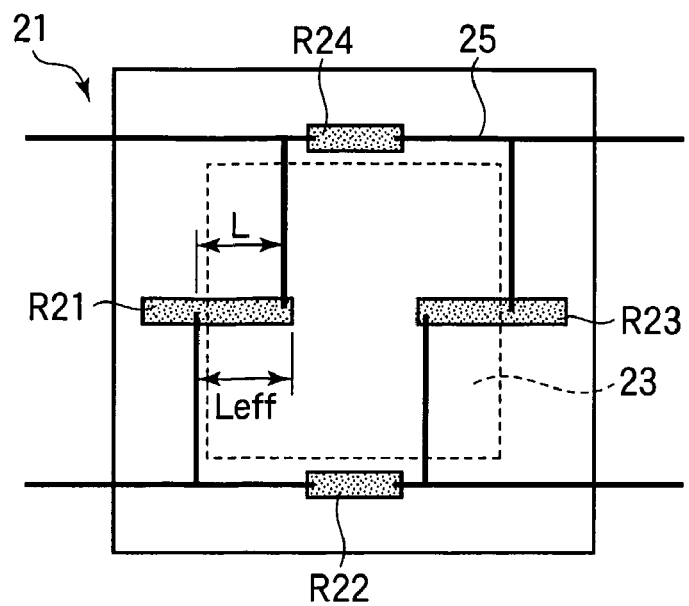
FIG. 11 is a schematic plan view of a semiconductor pressure sensor according to Embodiment 3 of the present invention.

FIG. 11 shows a schematic plan view of a semiconductor pressure sensor 21 according to Embodiment 3 of the present invention. As in the case of Embodiment 1, the semiconductor pressure sensor 21 of this embodiment is provided with linear piezo resistor elements R21 to R24. However, this embodiment is different from Embodiment 1 in that the lengths of the piezo resistor elements R21, R23 arranged across a diaphragm 23 are greater than those of Embodiment 1 and the piezo resistor elements R21, R23 are connected to wiring 25 at positions (positions of contact holes) closer to the center in the longitudinal direction of the piezo resistor elements R21, R23 than Embodiment 1.

The portions of the piezo resistor elements R21 to R24 which function as piezo resistor elements are not the portions corresponding to their actual lengths but the portions to which a voltage is applied, in other words, the portions up to the positions at which the piezo resistor elements are connected to the wiring 25. Therefore, the overall length L of the piezo resistor elements R21, R23 is specified by the distance between the positions at which the wiring 25 is connected in this embodiment. By forming the piezo resistor elements R21, R23 to a relatively long size makes and then adjusting the positions at which they are connected to the wiring 25 as appropriate, it is possible to arbitrarily set the overall length L and their positions within the range in which the piezo resistor elements R21, R23 are formed. In this sense, the actual length and the overall length L of the piezo resistor elements are distinguished. In this embodiment, the piezo resistor elements R21, R23 are formed in such a way that the width=3 μm, overall length L=10 μm and Leff/L=0.9. Furthermore, the diaphragm 23 is a square having a length per side of 100 μm.

Next, the manufacturing processes of the semiconductor pressure sensor 21 according to this embodiment will be explained with reference to FIG. 12 which is a sectional view along the piezo resistor elements R21, R23 which extend across the diaphragm 23 in FIG. 11.

Figure 12A:
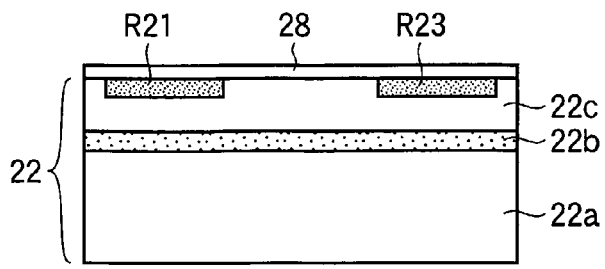
FIGS. 12A, 12B, 12C, 12D and 12E are sectional views illustrating manufacturing processes of the semiconductor pressure sensor shown in FIG. 11.

As shown in FIG. 12A, a thermal oxide film 28 is formed on a surface layer 22c of an SOI substrate 22 to a film thickness of 30 nm, a resist (not shown) is applied thereto and patterned. Then, the piezo resistor elements R21 to R24 were formed in the surface layer 22c. The SOI substrate 22 has the surface layer 22c having a thickness of 1.5 μm with n-type $1\times10^{16}$/$cm^3$ phosphorus injected. Furthermore, the thickness of the embedded oxide film 22b is 200 nm. The piezo resistor elements R21 to R24 were formed by injecting a dose of $5\times10^{13}$/$cm^2$ of $BF_2$ into the surface layer 22c through an ion injecting method at an acceleration voltage of 60 kV, and after peeling the resist and cleaning, activating the surface layer 22c of the SOI substrate 22 through 30-minute thermal treatment at 1000° C. in a nitrogen atmosphere. The actual lengths of the formed piezo resistor elements R21, R23 in the longitudinal direction are set to 20 μm. Furthermore, the piezo resistor elements R21 to R24 demonstrated a sheet resistance of 2.5 kΩ.

Figure 12D:
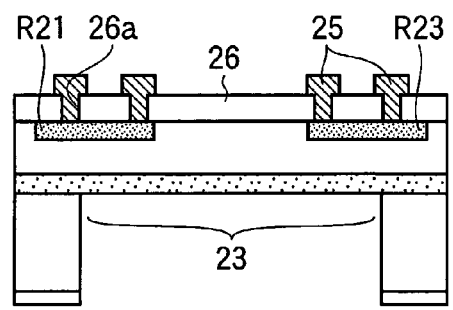
Figure 12B:
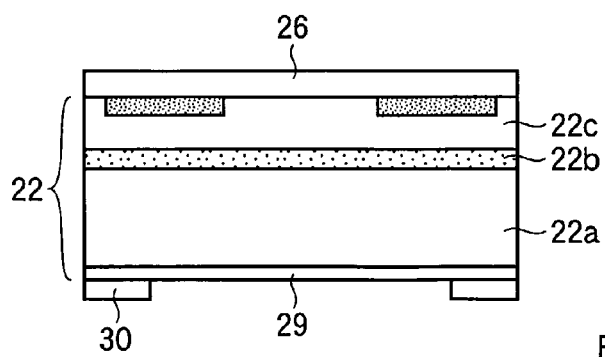

Next, as shown in FIG. 12B, an SiO film was formed as an inter-layer insulating film 26 on the surface layer 22c using a plasma CVD method to a film thickness of 200 nm. Then, a plasma oxide film 29 for ICP-RIE was piled on the back of the SOI substrate 22 (surface on a supporting layer 22a side) to a film thickness of 3 μm and a resist 30 was further applied thereto.

The resist 30 was patterned in accordance with the shape of the diaphragm 23, the plasma oxide film 29 was subjected to dry etching and the supporting layer 22a was etched using an embedded insulating film 22b as an etching stopper layer as in the case of Embodiment 2. In this way, the diaphragm 23 was formed as shown in FIG. 12C. After the diaphragm 23 was formed, the edge positions of the diaphragm 23 were monitored accurately and stored as data.

Next, as shown in FIG. 12D, contact holes 26a are formed in the inter-layer insulating film 26. The contact holes 26a were formed by applying a resist to the surface of the inter-layer insulating film 26, patterning the applied resist and then applying dry etching thereto. The patterning of the resist was performed based on the stored edge position data of the diaphragm 23 so that Leff/L 0.9 especially for the piezo resistor elements R21, R23 in accordance with the already formed diaphragm 23. Then, an aluminum film as the wiring 25 was formed in a predetermined pattern using a sputtering method and a Wheatstone bridge circuit was constructed. A mask is used to form the wiring 25 in a predetermined pattern and it is preferable to manufacture this mask so as to be placed along the piezo resistor elements R21, R23 so that it is adaptable to any locations of the contact holes 26a.

Figure 12E:
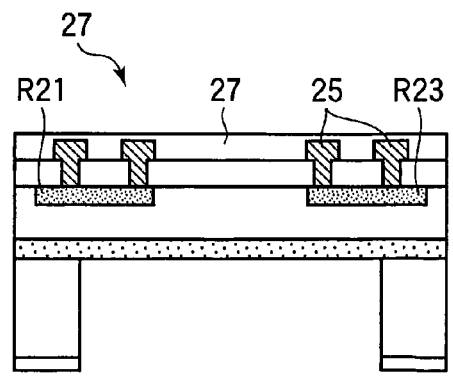
Figure 12C:
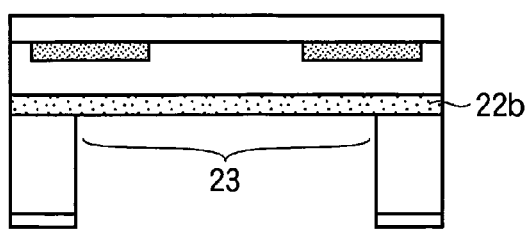

After the formation of the wiring 25, as shown in FIG. 12E, an SiN film is formed as a protective film 27 to a film thickness of 300 nm using a plasma CVD method, and to form a pad for an electrical connection to the outside, the wiring 25 was partially exposed through application of a resist to the SiN film, patterning and dry etching.

As explained above, after the formation of the diaphragm 23, the effective positions of the piezo resistor elements R21, R23 are confirmed based on the positional information of the diaphragm 23. More specifically, by forming the contact holes 26a, the positional accuracy of the piezo resistor elements R21, R23 with respect to the diaphragm 23 improves and Leff/L can be set more accurately, and therefore it is possible to realize a high sensitivity semiconductor pressure sensor 21.

Embodiment 4

Figure 13:
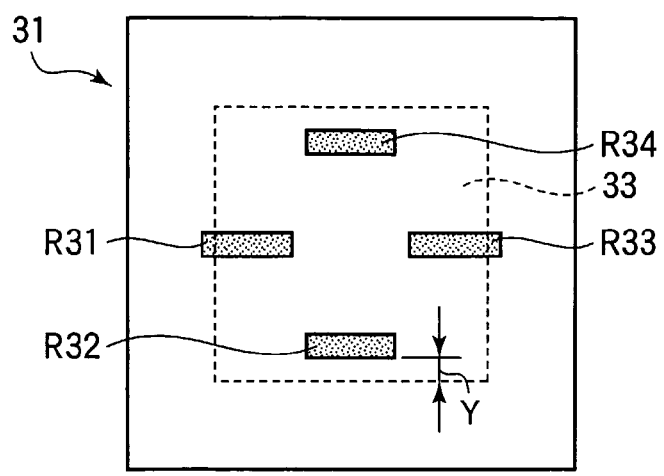
FIG. 13 is a schematic plan view of a semiconductor pressure sensor according to Embodiment 4 of the present invention.

FIG. 13 shows a schematic plan view of a semiconductor pressure sensor 31 according to Embodiment 4 of the present invention. In FIG. 13, wiring is omitted. The semiconductor pressure sensor 31 of this embodiment is structurally different from Embodiment 3 in that two piezo resistor elements R32, R34 arranged parallel to the edges of a diaphragm 33 facing each other in the direction perpendicular to the direction in which piezo resistor elements R31, R33 arranged across the edges of the diaphragm 33 face each other are arranged inside the diaphragm 33 and the widths of the piezo resistor elements R31 to R34 are 5 μm. Other aspects, for example, that the diaphragm 33 is a square having a length per side of 100 μm, that the piezo resistor elements R31, R33 arranged across the diaphragm 33 have an overall length L=10 μm and are arranged so that Leff/L=0.9 are the same as Embodiment 3.

Figure 14:
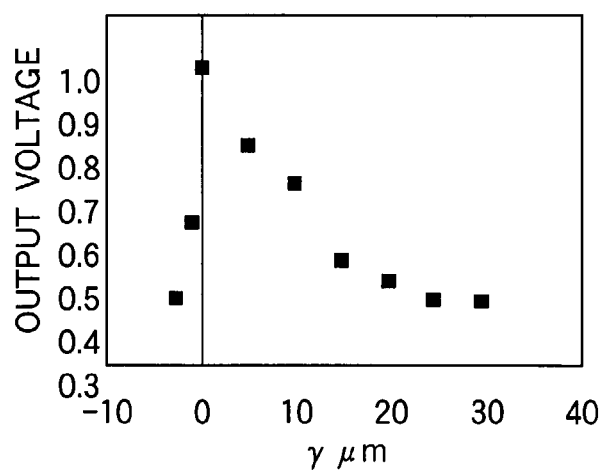
FIG. 14 is a graph showing a relationship between the distance from an edge of the diaphragm and output voltage of the piezo resistor elements arranged along the edges of the diaphragm of the semiconductor pressure sensor shown in FIG. 13.
Figure 15:
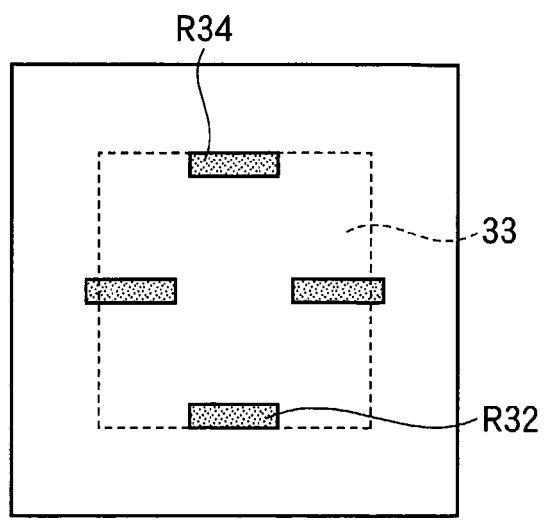
FIG. 15 is a plan view showing an arrangement of the piezo resistor elements corresponding to maximum sensitivity in Embodiment 4 of the present invention.

Here, several semiconductor pressure sensors 31 were manufactured by changing the distance Y of the piezo resistor elements R32, R34 from the edge of the diaphragm 33 and output voltages when a pressure of 100 kPa is applied to the diaphragm 33 were measured. FIG. 14 shows a relationship between the distance Y of the piezo resistor elements R32, R34 from the edge of the diaphragm 33 and the output voltage. As is evident from FIG. 14, the output voltage increases as the distance Y from the edge of the diaphragm 33 approximates to Y=0 and becomes a maximum when Y=0. Furthermore, when the piezo resistor elements R31, R33 are arranged at positions beyond the edges of the diaphragm 33 (in this case, the value of Y is expressed with a minus sign), the output voltage drops drastically. As shown in FIG. 15, maximum sensitivity is obtained when the piezo resistor elements R32, R34 are arranged so as to coincide with the edges of the diaphragm 33.

Next, the manufacturing processes of the semiconductor pressure sensor 31 of this embodiment will be explained with reference to FIGS. 16A to 16C which is a sectional view along the piezo resistor elements R31, R33 which extend across the diaphragm 33 in FIG. 13.

Figure 16A:
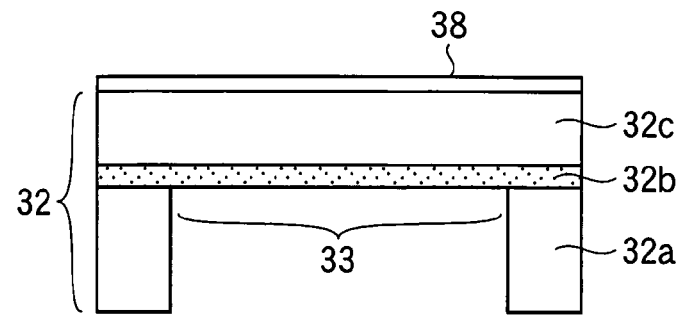
FIGS. 16A, 16B and 16C are sectional views illustrating manufacturing processes of the semiconductor pressure sensor shown in FIG. 14.
Figure 16B:
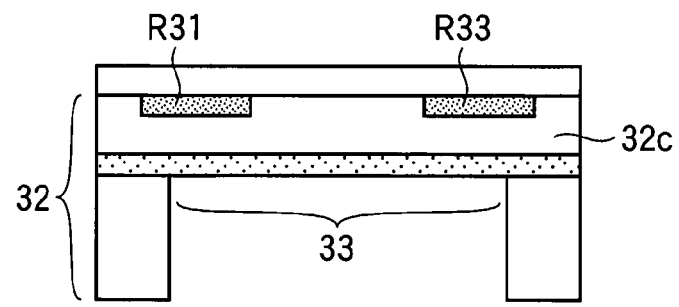

First, as shown in FIG. 16A, a thermal oxide film 38 was formed on a surface layer 32c of an SOI substrate 32 to a film thickness of 30 nm. The surface layer 32c of the SOI substrate 32 has a thickness of 1.5 μm with n-type $1\times10^{16}/cm^3$ phosphorus injected. Furthermore, the thickness of an embedded oxide film 32b is 200 nm. Then, a plasma oxide film (not shown) for ICP-RIE was piled on the back of the SOI substrate 32 (surface on a supporting layer 32a side) to a film thickness of 3 μm and a resist (not shown) was further applied thereto. The resist was patterned in accordance with the shape of the diaphragm 33, the plasma oxide film was then subjected to dry etching and the supporting layer 32a was etched using the embedded insulating film 32b as an etching stopper layer as in the case of Embodiment 2 to form the diaphragm 33. After the diaphragm 33 was formed, the edge positions of the diaphragm 33 were monitored accurately and stored as data.

Next, a resist (not shown) is applied to the thermal oxide film 38 and areas of the applied resist where the piezo resistor elements R31 to R34 are formed are arranged based on the stored edge position data of the diaphragm 33. With regard to the piezo resistor elements R31, R33, Leff/L=0.9 and the other piezo resistor elements R32, R34 were patterned so as to be located at the edges of the diaphragm 33. Next, a dose of $5\times10^{13}/cm^2$ of $BF_2$ was injected into the surface layer 32c using an ion injection method at an acceleration voltage of 60 kV, and after peeling away the resist and cleaning, 30-minute thermal treatment was conducted at 1000° C. in a nitrogen atmosphere. In this way, the surface layer 32c of the SOI substrate 32 was activated and the piezo resistor elements R31 to R34 were thereby formed as shown in FIG. 16B.

Figure 16C:
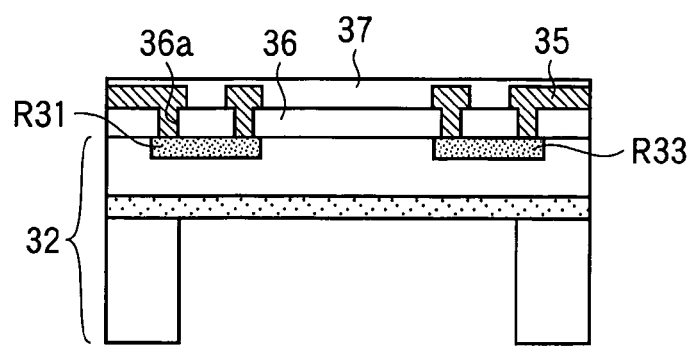

Next, as shown in FIG. 16C, an SiO film was formed on the surface of the SOI substrate 32 on which the piezo resistor elements R31 to R34 were formed as an inter-layer insulating film 36 to a film thickness of 200 nm using a plasma CVD method. Contact holes 36a were formed in this inter-layer insulating film 36 through resist patterning and dry etching, then an aluminum film was formed as wiring 35 in a predetermined pattern using a sputtering method and a Wheatstone bridge circuit was constructed. After the formation of the wiring 35, an SiN film was formed as a protective film 37 to a film thickness of 300 nm using a plasma CVD method. Furthermore, to form a pad for an electrical connection to the outside, the wiring 35 was partially exposed through application of a resist to the SiN film, patterning and dry etching.

As explained above, after the formation of the diaphragm 33, the effective positions of the piezo resistor elements R31, R33 are confirmed based on the positional information of the diaphragm 33. More specifically, by performing patterning of a resist to form the piezo resistor elements to the surface layer 32c of the SOI substrate 32, the positional accuracy of the piezo resistor elements R31, R33 with respect to the diaphragm 33 improves and Leff/L can be set more accurately, and therefore it is possible to realize a high sensitivity semiconductor pressure sensor 31.

Embodiment 5

Figure 17:
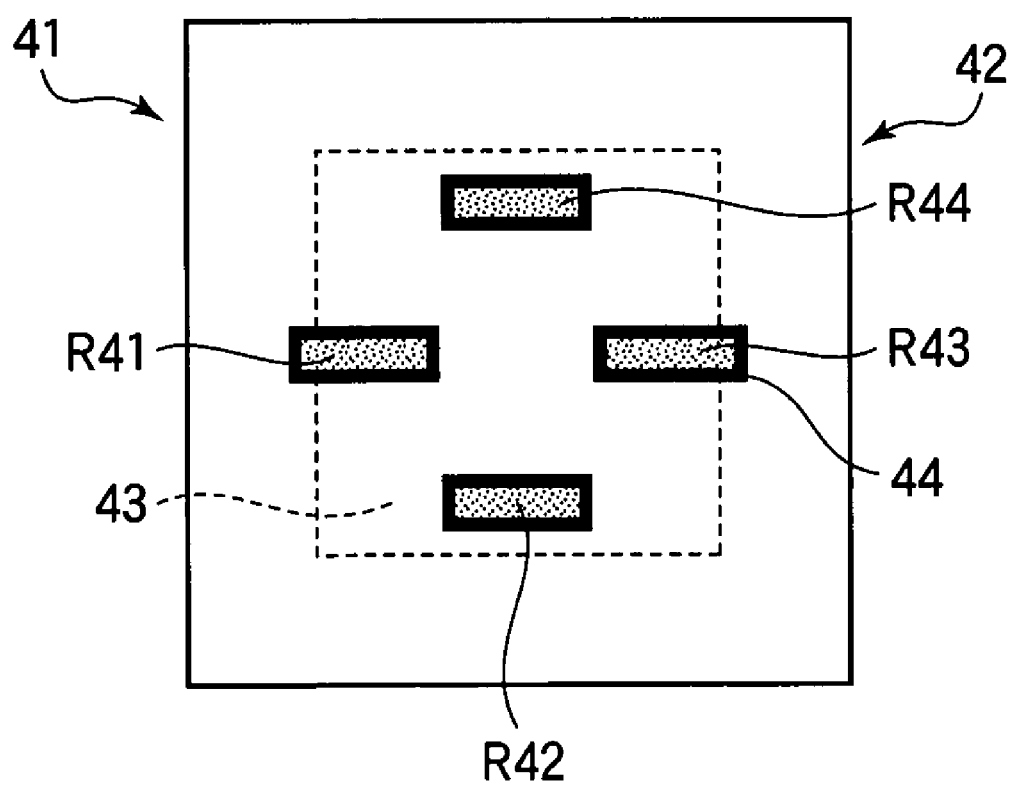
FIG. 17 is a schematic plan view of a semiconductor pressure sensor according to Embodiment 5 of the present invention.

FIG. 17 shows a schematic plan view of a semiconductor pressure sensor 41 according to Embodiment 5 of the present invention. In this embodiment, the entire area of the surface of the SOI substrate 42 is a diffusion area and piezo resistor elements R41 to R44 are formed by being separated from the rest of the diffusion area by circumferential grooves 44 and the rest of the structure is the same as that in Embodiment 4.

The manufacturing processes of the semiconductor pressure sensor 41 of this embodiment will be explained with reference to FIGS. 18A to 18C.

Figure 18A:
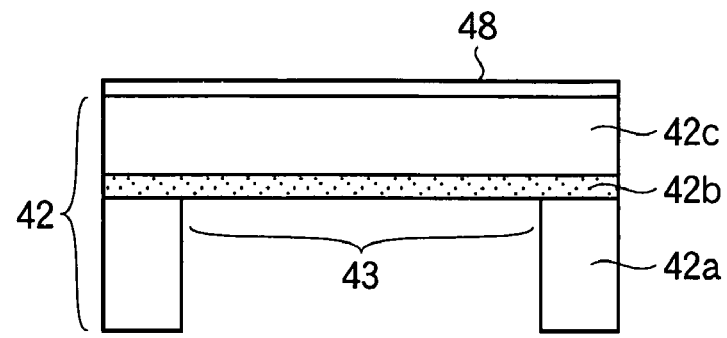
FIGS. 18A, 18B and 18C are sectional view illustrating manufacturing processes of the semiconductor pressure sensor shown in FIG. 17.
Figure 18B:
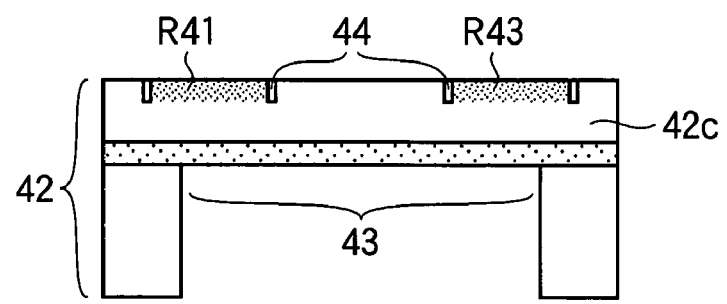

First, as shown in FIG. 18A, a thermal oxide film 48 was formed on a surface layer 42c of the SOI substrate 42 to a film thickness of 30 nm. The SOI substrate 42 is the same as the substrate in Embodiment 4. Next, a dose of $5\times10^{13}/cm^2$ of $BF_2$ was injected into the entire surface layer 42c using an ion injection method at an acceleration voltage of 60 kV. After cleaning, through 30-minute thermal treatment at 1000° C. in a nitrogen atmosphere, the surface layer 42c was activated.

Next, the back of the SOI substrate 42 was etched in the same way as for Embodiment 4 and a diaphragm 43 was formed. After the diaphragm 43 was formed, the edge positions of the diaphragm 43 were monitored accurately and stored as data.

Next, a resist is applied to the activated surface layer 42c. The resist applied is patterned so that frame-shaped openings surrounding the areas which become the piezo resistor elements R41 to R44 are formed. This patterning is arranged based on the stored position data of the diaphragm 43. With regard to the piezo resistor elements R41, R43, Leff/L=0.9 and patterning was performed for the other piezo resistor elements R42, R44 so that they are arranged inside by 3 μm from the edges of the diaphragm 43. Then, as shown in FIG.

18B, the surface layer 42c was etched and circumferential grooves 44 were formed. The depth of the circumferential grooves 44 is equal to or greater than the depth of the activated areas of the surface layer 42c. In this way, the areas surrounded by the circumferential grooves 44 are electrically separated from the outside areas and the areas surrounded by the circumferential grooves 44 become the piezo resistor elements R41 to R44. That is, the positions of the piezo resistor elements R41 to R44 are confirmed by the circumferential grooves 44 in this embodiment.

Figure 18C:
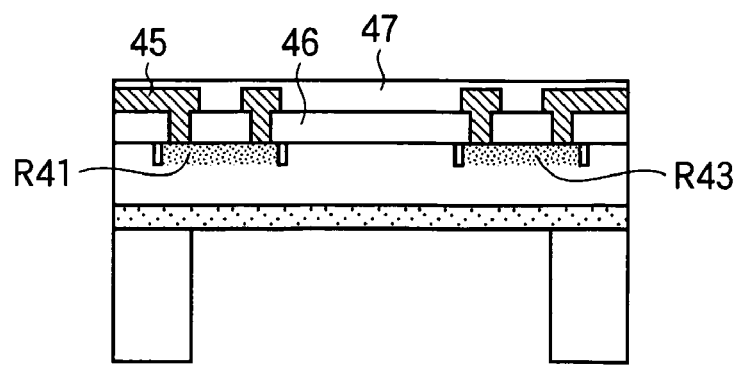

After the piezo resistor elements R41 to R44 are formed, as shown in FIG. 18C, an inter-layer insulating film 46, wiring 45, protective film 47, etc., are formed. These series of processes are the same as those in Embodiment 4, and therefore explanations thereof will be omitted here.

As explained above, according to this embodiment, by performing ion injection over the entire surface of the surface layer 42c and then forming the circumferential grooves 44, the piezo resistor elements R41 to R44 are formed, and therefore it is possible to form the piezo resistor elements R41 to R44 without performing patterning for ion injection. Moreover, the positions of the piezo resistor elements R41, R44 are confirmed based on the positional information of the diaphragm 43 after the formation of the diaphragm 43, and therefore, the positional accuracy of the piezo resistor elements R41, R43 with respect to the diaphragm 43 improves. Furthermore, since Leff/L can be set more accurately, the semiconductor pressure sensor 41 with higher sensitivity is realized.

Embodiment 6

Figure 19:
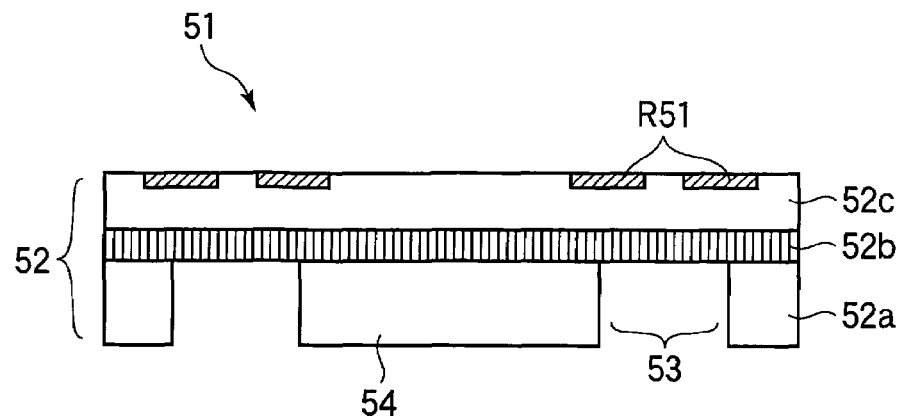
FIG. 19 is a sectional view of an acceleration sensor according to Embodiment 6 of the present invention.
Figure 20:
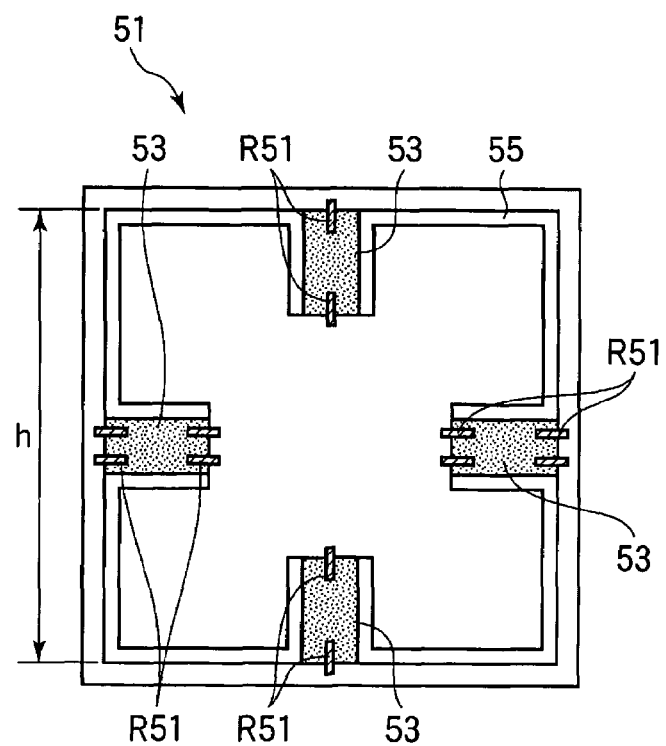
FIG. 20 is a schematic plan view of the acceleration sensor shown in FIG. 19.
Figure 21:
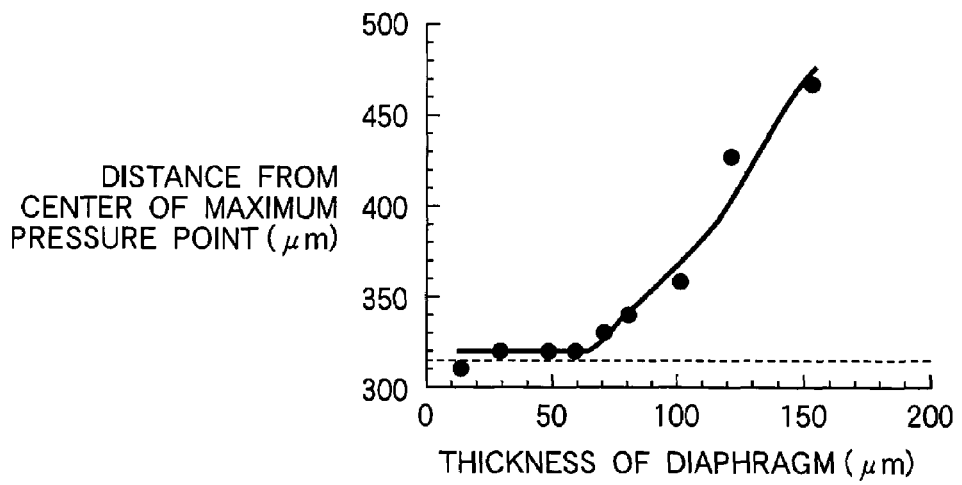
FIG. 21 is a graph showing a relationship between the thickness of a diaphragm and peak positions of compression stress from the center of the diaphragm in a conventional semiconductor pressure sensor.
Figure 22:
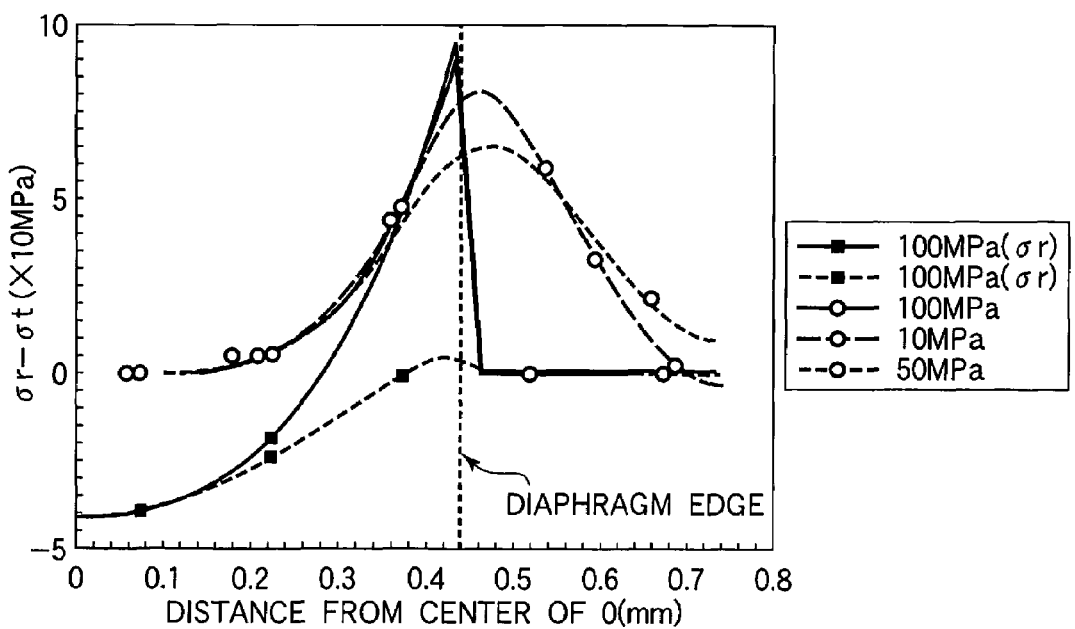
FIG. 22 is a graph showing a stress distribution with respect to the distance from the center of the diaphragm in the conventional semiconductor pressure sensor.

This embodiment will explain an acceleration sensor as another example of the semiconductor device. FIG. 19 is a sectional view of an acceleration sensor according to Embodiment 6 of the present invention and FIG. 20 is a schematic plan view of the acceleration sensor shown in FIG. 19.

In the acceleration sensor 51 of this embodiment, an SOI substrate 52 is used as a semiconductor substrate. The SOI substrate 52 includes a supporting layer 52a having a thickness of 1.5 µm, an embedded insulating layer 52b having a thickness of 200 nm and a surface layer 52c with n-type $1 \times 10^{16}/cm^3$ phosphorus injected. The acceleration sensor 51 has a weight 54 in the center. The weight 54 is held to its surrounding substrate part by four diaphragm areas 53 with a separation area 55 as spacing. The four diaphragm areas 53 are areas obtained by removing the supporting layer 52a of the SOI substrate 52 to the level of an embedded insulating layer 52b and arranged at positions at which the weight 54 is sandwiched from two directions perpendicular to each other within the plane of the SOI substrate 52.

A plurality of piezo resistor elements R51 are provided on the surface layer 52c of the SOI substrate 52 across the inside and outside of the respective diaphragm areas 53. The piezo resistor elements R51 are arranged at positions corresponding to both ends of the respective diaphragm areas 53 in the direction in which the respective diaphragm areas 53 connect the perimeter of the SOI substrate 52 and the weight 54. In this embodiment, the piezo resistor elements R51 are of a linear type and formed in the same way as for the aforementioned embodiments.

When acceleration acts on this acceleration sensor 51, stress acts on the diaphragm area 53 and the diaphragm area 53 is deformed according to the stress. When the diaphragm area 53 is deformed, the resistance of the piezo resistor element R51 on the diaphragm area 53 changes, and therefore it is possible to detect the acceleration by measuring the output values of the respective piezo resistor elements R51.

This embodiment has a structure in which the four diaphragm areas 53 hold the weight 54 and through action of an external force, the entire part between the two opposing diaphragm areas 53, in other words, the part inside the outer perimeter of the separation area 55 shifts. Therefore, in such a structure, the length per side h of the diaphragm section in the present invention is defined by this shifting part as shown in FIG. 20. In this embodiment, it is assumed that the length per side h of the diaphragm section is 200 µm and the overall length L of the piezo resistor element R51 is 20 µm.

Then, the acceleration sensor 51 is manufactured by changing the value of Leff and when Leff/L was greater than 0.5, the output voltage increased as in the case of the aforementioned pressure sensor. Though it actually depends on the size of the diaphragm section and overall length L of the piezo resistor elements R51, an index for the boundary on which the output voltage varies drastically can be generally Leff/L=0.5.

This application claims priorities from Japanese Patent Applications No. 2004-176853 filed Jun. 15, 2004 and No. 2004-377613 filed Dec. 27, 2004, which are hereby incorporated by reference herein.

The invention claimed is:

1. A semiconductor device comprising a distortion detecting device provided on a semiconductor substrate that includes a diaphragm section, the distortion detecting device extending in an overlapping manner from a region inside the diaphragm section across an edge of the diaphragm section to a region outside of the diaphragm section so as to satisfy a relationship:

$$0.5 < Leff/L < 1,$$

where L is an overall length of the distortion detecting device and Leff is a length from a first end of the distortion detecting device to the edge of the diaphragm section.

2. The semiconductor device according to claim 1, wherein the distortion detecting device includes a loopback section overlapping a region of the diaphragm section, and wherein the loopback section is formed to be in contact with the first end.

3. The semiconductor device according to claim 1, wherein the distortion detecting device is part of a group of four distortion detecting devices that are electrically connected so as to form a Wheatstone bridge circuit, and wherein two opposing distortion detecting devices of the group are arranged so as to satisfy the relationship: 0.5<Leff/L<1.

4. The semiconductor device according to claim 1, wherein the overall length L of the distortion detecting device is substantially a length of a path through which a current flows.

5. The semiconductor device according to claim 1, wherein the overall length L of the distortion detecting device is specified by a connection position of wiring connected to the distortion detecting device.

6. The semiconductor device according to claim 1, wherein the semiconductor substrate is an SOI substrate with an insulating layer interposed between a supporting layer made of a semiconductor material and a surface layer, wherein the distortion detecting device is formed in the surface layer, and wherein a portion of the supporting layer is removed to thereby form the diaphragm section.

7. The semiconductor device according to claim 1, wherein the distortion detecting device is formed of a second conductivity-type diffusion area formed in a first conductivity-type semiconductor layer.

8. The semiconductor device according to claim 1, wherein the distortion detecting device is part of a plurality of distortion detecting devices that are formed by electrically separating parts of a second conductivity-type diffusion area formed over an entire area of a first conductivity-type semiconductor layer from other parts by grooves.

9. The semiconductor device according to claim 1, wherein the distortion detecting device is arranged so as to satisfy LX≦20 m, where LX is a distance from an edge of a part of the distortion detecting device that overlaps the diaphragm section to an edge of the diaphragm section, in which the edge of the part of the distortion detecting device is parallel to the edge of the diaphragm section.

10. The semiconductor device according to claim 9, wherein LX≦10 m.

11. The semiconductor device according to claim 1, wherein the diaphragm section has a planar shape of a square having a length per side of 400 m or less.

12. The semiconductor device according to claim 1, wherein Leff≧a, where a is a thickness of the diaphragm section.

13. The semiconductor device according to claim 1, wherein √h≧Leff, where h is a length per side of the diaphragm section.

14. A semiconductor pressure sensor comprising a distortion detecting device provided on a semiconductor substrate that includes a diaphragm section, the distortion detecting device extending in an overlapping manner from inside a region of the diaphragm section across an edge of the diaphragm section to a region outside of the diaphragm section so as to satisfy a relationship:

$$LX \leq 20 \, \mu m,$$

where LX is a distance between an internal part of the diaphragm section and an edge of the diaphragm section.

15. The semiconductor device according to claim 1, wherein the distortion detecting device is part of a plurality of distortion detecting devices of the semiconductor device.

16. The semiconductor pressure sensor according to claim 14, wherein the distortion detecting device is part of a plurality of distortion detecting devices of the semiconductor pressure sensor.

* * * * *